United States Patent
Toma

[11] 3,941,972
[45] Mar. 2, 1976

[54] SHEAR IN GAP FLASH WELDER
[75] Inventor: Charles A. Toma, Warren, Ohio
[73] Assignee: The Taylor-Winfield Corporation, Warren, Ohio
[22] Filed: Jan. 20, 1975
[21] Appl. No.: 542,308

[52] U.S. Cl. ................................................. 219/97
[51] Int. Cl.² ...................................... B23K 11/04
[58] Field of Search ....................... 219/97, 101, 82

[56] References Cited
UNITED STATES PATENTS

| | | | |
|---|---|---|---|
| 2,328,784 | 9/1943 | Coates et al. | 219/97 |
| 3,249,732 | 5/1966 | Cooper et al. | 219/97 |
| 3,426,952 | 2/1969 | Chew et al. | 228/5.7 |
| 3,808,393 | 4/1974 | Goodwin et al. | 219/97 |

Primary Examiner—Arthur T. Grimley
Assistant Examiner—D. A. Tone
Attorney, Agent, or Firm—William J. Ruano

[57] ABSTRACT

A flash welding machine which comprises two pairs of current-carrying welding electrodes, one pair movable and the other, stationary. A double cut guillotine shear is normally positioned forwardly and alongside the welder at a "stand-by" position, remote from the welding position to avoid splattering from welding sparks. When it is desired to shear and weld, carriage means move the shear longitudinally alongside the machine and then laterally into a gap formed by moving the movable pair of welding electrodes from the stationary pair. Depending upon the selected gauge bar of a ladder-like gauge bar construction mounted on each side of the shear when in the "stand-by" position, such selected gauge bars are clamped between the lower current-carrying dies and the lower blades of the shear so as to provide back-up support for such blades as well as to tightly clamp the selected gauge bars for accurate gauging of the projection of strip desired beyond the welding dies after shearing. The welding dies, after clamping of the strips therebetween preparatory for welding, remain clamped until after the welding operation to avoid introduction of positioning errors, thereby assuring that the ends of the strip are cut squarely, parallel and in exact registry to provide an excellent weld.

8 Claims, 10 Drawing Figures

SHEAR IN GAP FLASH WELDER

This invention relates to a method of welding two lengths of strip material together end-to-end, and to a machine for performing the method and having two pairs of welding dies, each pair of welding dies being adapted to clamp the adjacent strip so that the strip ends which are to be joined together are located between the two pairs of welding dies for welding together.

The present invention is an improvement of that shown in J. H. Cooper et al. U.S. Pat. No. 3,249,732, dated May 3, 1966, assigned to the present assignee. In such patent, the strip ends are sheared outside the apparatus. Each strip end is moved against a gauge bar in the gap between the two pairs of dies of the flash welding means, which gauge bar is adjusted for the thickness of the strip being welded. The welding dies of the flash welding means are then closed on the strip, separated slightly from each other to allow the gauge bar to be withdrawn, after which the flash welding process is commenced. After welding, the strip may be moved by a transfer clamp so that the weld upset is situated in position opposite a trimming machine and, if required, further movements may be made to a notching and punching machine or to other work stations as required.

In order to obtain a good weld with these arrangements it is necessary and extremely important that the ends of the strip are cut cleanly and squarely, that these two ends are then abutted against each side of the gauge bar so that after clamping, the ends are parallel to each other and aligned in a lengthwise direction. After welding, the strip has to be moved the correct distance for trimming.

Occasionally the sheared strip end is not butted against the gauge bar at both the operator and drive end of the machine. This causes non-uniform extension of the strip ends from the welding electrodes and results in poor quality welds. The welding machine operator must correct the non-uniform extension by repeating the clamping sequence making certain that the extension is uniform laterally across the machine. It is also necessary that the extension of strip from the welding electrodes be the same on both the moveable platen and stationary platen. When the strip ends have to be repositioned, there is a loss of time and decreased production.

The operator abuts the sheared strip against the gauge bar by creating a loop of strip which, when released, causes the strip to move against the gauge bar. Operator experience is an important and practically indispensable feature in achieving contact of the strip edge along the face of the gauge bar. Operator error may result in nonachievement of the required result.

If the strip is wavy (not flat), the strip pulls away from the space bar when it is clamped. The clamping sequence may have to be repeated several times until the strip will remain against the gauge bar. The loss of time results in loss of tonnage.

The principle object of the present invention is to provide means to avoid the necessity of locating the strip ends precisely against the gauge bar.

Means are also provided to eliminate the influence of wavy strip in effecting non-uniform extension of the strip from the welding dies prior to welding.

A further object is to enhance the possibility of making the weld at right angles to the strip center line.

An object of the present invention is to overcome the abovenamed disadvantages and to provide apparatus for accurately locating, shearing, moving to weld position, flash welding, trimming the weld upset and, if necessary, other operations such as notching and punching strip metal or like workpieces.

A further object is to provide apparatus more easily automated, therefore, removing to a greater degree dependence on operator error.

A still further object is to reduce the time required to prepared for welding, while providing highly improved quality of prewelded strip ends, and, as a result, enhance the probability of attaining the necessary weld quality.

Still another object of the present invention is to interpose the shear in the gap between the current carrying welding dies and to support the shear by clamping it between said dies and retain the closed condition of the welding dies on the strip ends continuously from the shearing to the welding operation to insure an excellent welded joint.

To make welds of high quality suitable for rolling, it is necessary to limit the material extension from the welder electrodes, for example, approximately .32 inches when welding 16 gauge strip. This dimension limits the thickness of the shear blade. To obtain the necessary strength and reduce deflection, the shear blades are effectively clamped between the movable and stationary platens when the shear cuts.

The strip ends are not moved after shearing so optimum conditions exist for welding.

Other objects and advantages will become more apparent from a study of the following description taken with the accompanying drawings wherein.

As stated previously, the present invention is an improvement of that shown in J. H. Cooper et al. U.S. Pat. No. 3,249,732. An important difference is that the gauge bar assembly located between the welding dies of the patent is omitted and replaced by a shear which is introduced in the gap between the dies when the tail end of the old strip and head end of the new strip are to be sheared. After shearing, the shear is moved laterally out of the gap and then longitudinally beyond the exit side of the welder for minimum exposure and splashing by sparks from the welding operation.

Important features of the invention are illustrated in FIGS. 4a to 4e inclusive, relating to the shearing and welding steps. While shears have been built into welders, such as shown in Chew et al. U.S. Pat. No. 3,426,952, dated Feb. 11, 1969, assigned to the present assignee, relating to an arc welder, significant features of improvement are covered by the present invention to insure a highly improved and reliable weld, as will be described hereinafter.

Figure 1:
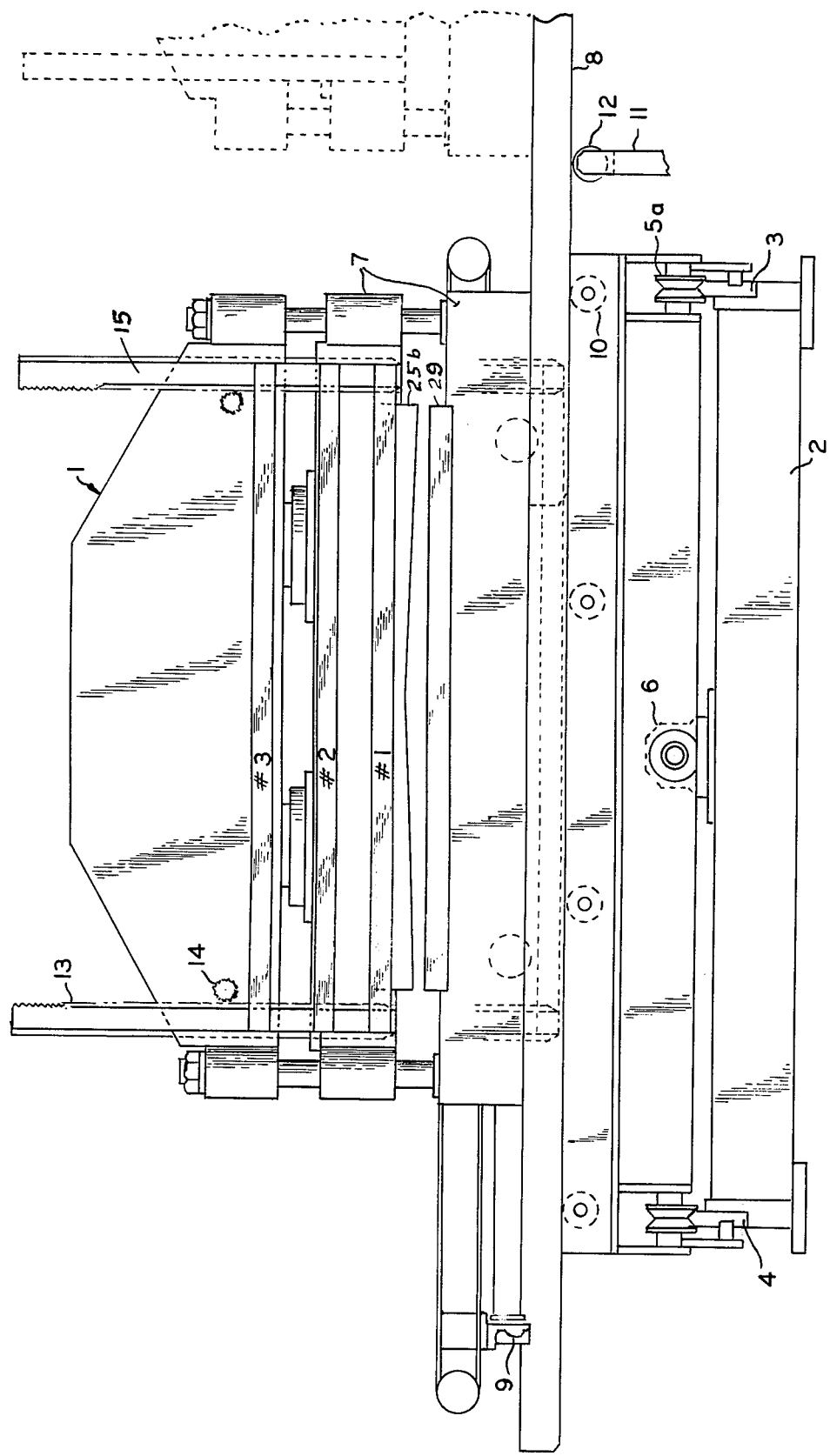
FIG. 1 is an elevational view of a guillotine type of shear which is interposed in the gap between the welding dies in accordance with the principles of the present invention.
Figure 2:
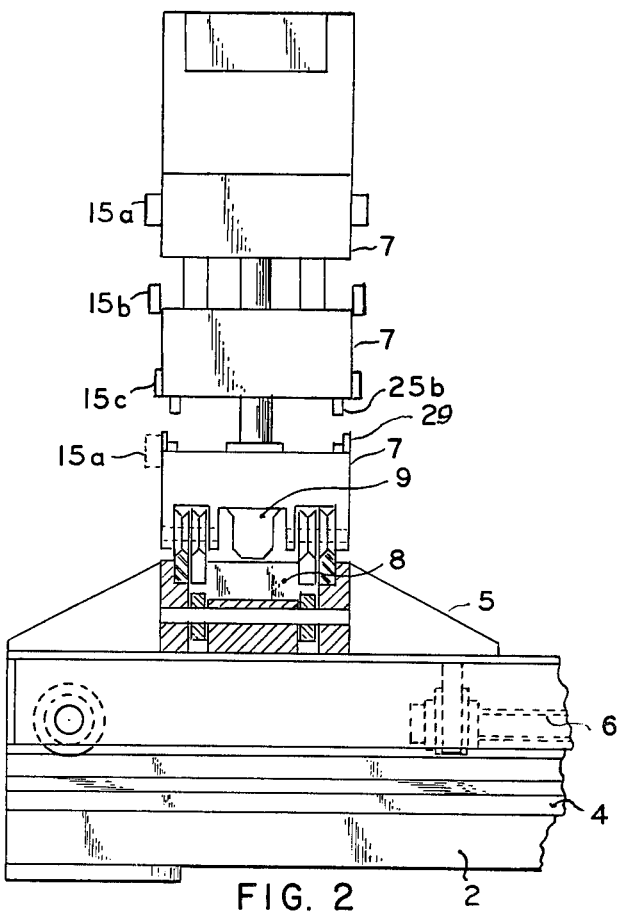
FIG. 2 is a side view thereof with the lower part shown in cross-section.

Referring more particularly to FIGS. 1 and 2 of the drawing, the shear assembly, denoted generally by numeral 1, is floor mounted on the drive side of the welder. Preferably a single stroke, double cut guillotine shear 7 is used to finish cut both tail end and head end of the strips to be joined. The "Stand-By" position of the shear, when not in use, is upstream of the "weld center line", beyond the exit side of the welder, thus placing the shear out of the vicinity of flash when welding. This will minimize the accumulation of splattered red hot material on the shear assembly as a consequence of the welding operation and thereby greatly prolong its life.

Attached to the mill foundation is the shear carriage base 2. Rails 3 and 4 are mounted on the base 2 on which the shear carriage 5 can be moved on wheels 5a, together with the shear 7, parallel to the welder.

Carriage travel from the "stand-by" position is produced by the operation of the fluid cylinder 6.

Shear carriage 5, with the shear 7 locked to it, is positioned opposite the "shear enter gap" between the welding dies of the welder.

When the tail end of the running strip has cleared the exit welding dies of the welder, the shear bridge 8 is unlocked from the shear 7. The shear traverse, fluid cylinder 9 is actuated to run the bridge 8, supported by rolls 10 on the carriage 5, out from underneath the shear 7. The bridge spans the welder side frames 11 and 11, being supported by side frame rolls 12 and 12. The newly positioned bridge 8 is locked to the welder and the shear 7 is unlocked from the carriage 5.

The shear traverse, fluid cylinder 9 is reversed to move the shear 7 from off the carriage 5 and onto the bridge 8. The shear 7 is locked to the bridge 8 and is now ready for loading and shearing in a manner illustrated in FIGS. 4a to 4e inclusive which will be described later.

After shearing strip ends and being released from the welder clamping effect, the shear 7 is unlocked from the bridge 8. The shear-traverse, fluid cylinder 9 is actuated to move the shear 7 from off the bridge 8 and onto the carriage 5.

The shear 7 is locked to the carriage 5 and the bridge 8 is unlocked from the welder. The shear traverse, fluid cylinder 9 is reversed to move the bridge 8 from out of the welder and underneath the shear 7 onto which it locks. The fluid cylinder 6 is then actuated to move the carriage 5 with the shear 7 upstream back to its "stand-by" position out of the range of welding flash, after which, welding is started.

As stated previously, an important feature of the invention is the elimination of the finish cut shear for cutting the strip ends before introduction into the welder, which eliminates inaccuracies in the attempt to make a perfectly square cut of the strip ends with fully abutting end surfaces. Another important feature is the elimination of the conventional gauge bar and operating mechanism located between the welding dies.

Instead, and in accordance with the present invention, a shear, preferably a single stroke, double cut guillotine shear, is introduced from the "stand-by" position alongside the forward portion of the welder, to the gap made between the welding dies, only at the time it is desired to simultaneously finish cut both tail end and head end of the strip to be joined by welding.

Figure 3C:
FIG. 3a is an elevational view of the shear spacer bar.
FIG. 3b is a side view thereof; and, FIG. 3c is a top view thereof.
Figure 3A:
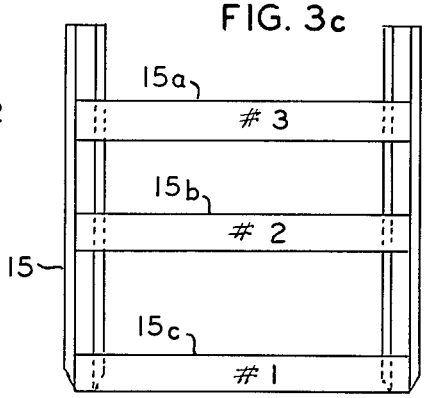
Figure 3B:

Mounted centrally of the shear is a strip gauge bar 15 of ladder-like construction in which the different rungs (FIG. 3a) are of different thicknesses to enable selective projections of the strip ends beyond the welding dies in which they are clamped before being sheared. The greater the thickness of the strip, the greater will be the extensions of the strip ends beyond the dies to be sheared off.

More specifically, and as an example, for a No. 1 setting of the gauge bar 15 for a strip 0.05 to 0.06 inch thick, the extension would be 0.32 inch; for a No. 2 setting for a strip 0.07 to 0.09 inch thick, the extension would be 0.44 inch; for a No. 3 setting for a strip 0.10 to 0.18 inch thick, the extension would be 0.66 inch and for a No. 4 setting (if desired) for a strip 0.20 to 0.25 inch thick, the extension would be 1.00 inch. It should be understood that these values are merely exemplary and may be altered in size and number.

Figure 4A:
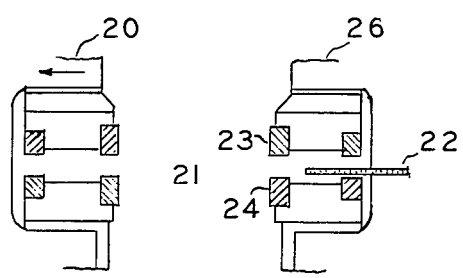
FIGS. 4a, 4b, 4c, 4d and 4e are somewhat diagrammatic showings of the successive steps for shearing and welding in accordance with the present invention.

IN OPERATION:

FIG. 4a shows the retraction of the movable entry side assembly 20 of the welder to provide a shear gap 21 between the movable entry side assembly 20 and the stationary exit side assembly 26 of the welder. The tail end 22 of the old strip has been cropped and run beyond the current carrying exit dies 23 and 24 as shown.

Figure 4B:
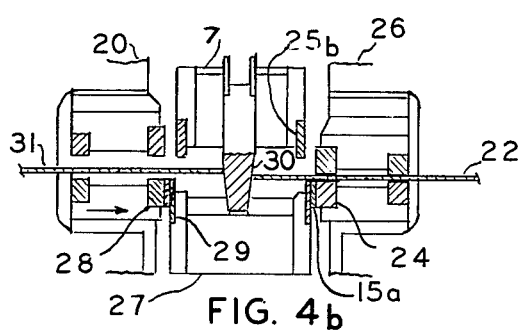

FIG. 4b shows the introduction of the shear 7 in the gap 21 in the manner described previously, that is, by movement, from the "stand-by" position, alongside the welding machine and then laterally into gap 21. The entry side welding dies 28 are actuated to clamp the lower shear blades 29 and gauge bars 15a between the lower entry die 28 and the lower exit die 24 to provide accurate gauging and very firm support of the lower shear blades 29. The tapered strip stop 30 is lowered to limit movement of the ends of strips 22 and 31 pushed thereagainst. The tail end 22 is jogged against the stop 30, looped, centered and clamped in the exit side dies 23, 24. The head end 31 of the new coil or strip is cropped and fed into the entry side assembly 20 and against the strip stop 30.

Figure 4C:
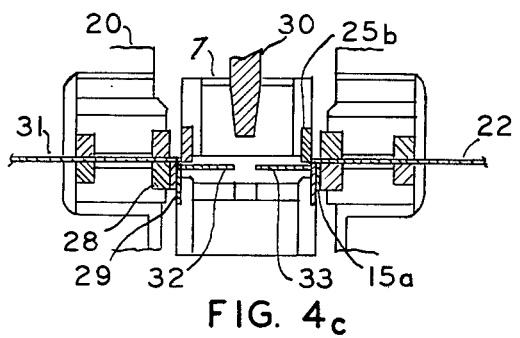

FIG. 4c shows the head end 32 of the new coil or strip 31 as being clamped in the entry side dies 28. The strip stop 30 is retracted and the shear 7 is actuated to shear the strip ends 32 and 33 by an amount previously selected by selective vertical adjustment of the gauge bar 15 while the shear is in the "stand-by" position. The scrap strip ends 32 and 33 will then drop onto a scrap removal device (not shown).

Figure 4D:
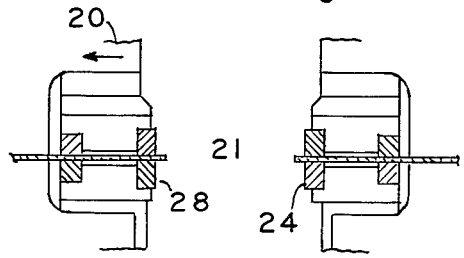

FIG. 4d shows the respective welding dies after the shearing has been completed and after the entry side 20 has been retracted to release the shear 7 from between the welding dies 28 and 24. The shear is withdrawn laterally and then moved longitudinally to the "stand-by" position alongside, forwardly of the welding dies and out of range of the flash from welding.

Figure 4E:
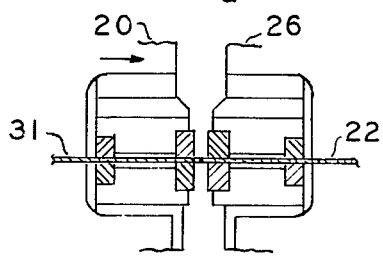

FIG. 4e shows the respective dies after the entry side assembly 20 moves toward the exit side assembly 26 sufficiently to allow the strip ends 22 and 31 to make contact and initiate the flash welding process to weld the strip ends together.

It should be especially noted first that the lower blades of the shear have full back up or support by being clamped by the respective welding dies, as shown in FIG. 4c, which assures accurate, square and smooth cutting of the edges of the strips. It should also be especially noted that once the respective strips are clamped between the welding dies, as shown in FIG. 4c, they remain clamped until they are brought together into contact for welding, as shown in FIG. 4e. In other words, there is no unclamping of the dies after they have been prepared for the shearing operation, or after such operation and the welding operation, thereby removing a strong possibility of inaccuracy in shearing a square cut along flat end surfaces.

Thus it will be seen that I have provided a novel shearing and welding method for insuring accurate shearing of the ends of strips to be welded so as to insure that the edges will register accurately throughout their widths and provide a perfect and strong weld and eliminate the danger of severing of the strip ends as a consequence of an imperfect weld; furthermore, I have provided a welding machine which eliminates the necessity of the usual gauge bar between the welding dies and possible inaccuracies of the sheared strip ends when brought together in abutment for welding; furthermore, I have provided a shear which is kept out of the range of flash or sparks from the flash welding process and which is moved along a novel carriage trackway, first longitudinally then laterally into the gap between the welding dies where the lower blades thereof are clamped by the welding dies for firm support, so as to resist bending as a consequence of shearing; also wherein the strip ends, when clamped will remain clamped until and through the welding process, thus preventing inaccuracies that otherwise would occur if the strip ends were unclamped and reclamped for the welding process as is conventionally done.

While I have illustrated and described a single specific embodiment of my invention, it will be understood that this is by way of illustration only and that various changes and modifications may be contemplated in my invention and within the scope of the following claims.

I claim:

1. The method of welding the ends of metal strip in a flash welding machine, comprising retracting the movable, current carrying welding die assembly from the fixed, current carrying welding die assembly to provide a gap therebetween, introducing a double blade guillotine shear into said gap, clamping both lower blades of said shear by the lower portions of said welding die assemblies so as to provide rigid support to said lower blades, projecting a stop between said movable and stationary welding dies, pushing said strip ends against said stop, clamping said strip ends between said stationary and movable welding dies, with extensions projecting beyond said dies, moving the upper blades of said shear downwardly to cut off preselected portions of said extensions, removing said shear from said gap, and moving said movable die assembly towards said fixed die assembly while said strip ends are still clamped therebetween until the ends of the strips come into contact so as to initiate flash welding.

2. The method recited in claim 1 wherein before said clamping, a gauge bar, mounted on said shear, is selectively moved downwardly between the lower shear blades and lower dies and clamped therebetween to selectively adjust their distance apart so as to accurately preselect the length of said extensions beyond the welding dies to be sheared in accordance with the thickness of said strip.

3. The method recited in claim 1 wherein a stop is introduced between said strip ends prior to shearing to provide a gap therebetween.

4. A flash welding machine comprising two pairs of current-carrying welding electrodes, a double blade guillotine type shear, means for moving said welding electrodes relatively apart to form a gap therebetween, means for moving said shear from an exterior position into said gap, and means for clamping both lower blades of said shear between both lower welding electrodes of said pairs to provide firm support therefor prior to shearing.

5. A flash welding shear as recited in claim 4 together with power operated carriage means for moving said shear from a stand-by position forwardly and alongside said machine away from sparks accompanying welding, alongside said machine, and into said gap.

6. A flash welding machine as recited in claim 5 wherein said carriage means includes means for effecting translation of said shear alongside said welding machine and means for subsequently effecting translation of said shear laterally of said machine into said gap between said welding electrodes, and vice versa.

7. A flash welding machine as recited in claim 4 together with a pair of gauge bars, mounted on opposite sides of said shear, means for selectively moving said gauge bars downwardly between the respective lower current carrying electrodes and lower shear blades prior to their being clamped together so as to predetermine the length of strips extending beyond said welding dies after shearing.

8. A flash welding machine as recited in claim 4 together with a stop element movable downwardly in said shear between said strip ends to determine the gap therebetween before the strip ends are clamped between said electrodes in preparation for shearing.

* * * * *